March 1, 1966 B. BALLARD ETAL 3,238,462

SYNCHRONOUS CLOCK PULSE GENERATOR

Filed Sept. 18, 1963

INVENTORS
ROGERS W. HARDER
BRUCE BALLARD

BY Fraser and Bogucki

ATTORNEYS 3,238,462

SYNCHRONOUS CLOCK PULSE GENERATOR

Bruce Ballard, Manhattan Beach, and Rogers W. Harder, Torrance, Calif., assignors to Telemetrics, Inc., Gardena, Calif., a corporation of California Filed Sept. 18, 1963, Ser. No. 309,803
7 Claims. (Cl. 328—63)

This invention relates to data processing systems, and more particularly to improved systems for generating clock pulses in synchronization with digital information signals having variable bit repetition rates.

A number of different methods are presently used for transmitting digital information from one location to another, each method involving the transmission of an electrical signal which has some characteristics (such as, its frequency, duration or amplitude) varied in a manner to indicate the digital information content. In many present systems the digital information is in binary form, wherein each individual binary digit or digital information is aloted one of a number of occurring equal intervals (termed bit intervals) during which the signal characteristics or change of characteristics therein signify the value of the specific bit. The binary digital information is normally represented by a signal characteristic varying between first and second values or varying between a first and a second sense. Any number of schemes (termed codes) may be used to represent binary digital information, some codes being more suited to certain types of information content or transmission systems than others. For example, the digital value of one may be represented by the presence of a change in voltage amplitude during a particular portion of a bit interval, while the binary value zero is represented by the absence of a change in amplitude during the bit interval. Alternatively, the value one may be represented in another binary code by a first potential level during the bit interval, while the digital value zero is represented by a second potential level.

In many binary codes, such as those mentioned above as exemplary, a great number of sequential bits of binary digital information may be represented without any change in the characteristic of the signal, since a constant sequence of bits, each having a zero binary value, is represented by a constant potential level according to either of the above-mentioned codes. Therefore, it is necessary for a system receiving this binary digital information to have some means of identifying each discrete bit interval in order to derive the information from the transmitted signal. Obviously, if either the bit interval or its frequency or reoccurrence (which is termed the bit repetition rate) is known, the number of binary digits occurring within any specified period and the instant during which a signal characteristic has information significance may both be determined and used to derive the transmitted information. While it is possible to transmit to the receiving system by means of a separate transmission channel a signal indicative of the bit repetition rate, the bit repetition rate is preferably derived from the received signal itself (hereinafter referred to as the "information signal") in order to avoid unnecessary complications and duplication of equipment.

Generally, a system for receiving digital information signals has circuitry for determining the bit repetition rate and generating a train of clock pulses having a frequency equal to the bit repetition rate and phase synchronized with the bit intervals of the transmitted information signals. Only after positive frequency and phase synchronization has been achieved between the information signals and the clock pulses can the digital information be derived without substantial error. Therefore, if too great a time period is consumed in achieving substantial synchronization, a great deal of information may be lost or erroneously interpreted by the receiving system.

The inevitable presence of electrical noise further complicates the problems involved in deriving digital information from a transmitted signal. Such noise, which often possesses characteristics substantially like certain portions of the digital signal, may be falsely interpreted as digital information when mixed with the incoming signals. Therefore, the receiving system must operate even in the presence of such noise to reconstruct the data and provide clock pulses substantially synchronized with the incoming data information signals.

A system capable of generating clock pulses from transmitted signals in a number of code forms has previously been described in detail in the co-pending U.S. application No. 207,176, of Douglas R. Maure, filed July 3, 1962, now issued as United States Patent No. 3,142,802, on July 28, 1964, and assigned to the same assignees as the present invention. This system generates and synchronizes clock pulses with incoming digital information signals having a variable bit repetition rate within an optimum period, and is capable of generating clock pulses at a constant rate for a substantial period during which no information signals are received. In addition, this previously disclosed system is capable of operation even in the presence of a substantial amount of noise mixed with the incoming information signals. Briefly, this system includes a data converter for transforming or reconstructing all received information data signals, regardless of form, into a preferred digital information code with which the clock pulses can be uniformly synchronized. Oscillations from the voltage controlled oscillator are provided through a frequency divider to a circuit for generating the clock pulses once each information bit interval. The phase position of the clock pulse with relation to each bit of the information signal may then be determined in a phase detector, and then a single count is either added or subtracted from the previous count contained in a reversible digital counter. The digital stages of the reversible counter are connected through an appropriate digital-to-analog converter to provide a voltage to control the frequency of the voltage controlled oscillator. This system also contains an automatic noise rejection control circuit operated by the clock pulse to limit the operating interval of the data converter to occur only during the appearance of significant portions of the information signals.

Briefly, this previously disclosed system might be characterized as a digital phase-locked loop in which each bit of the information signal is compared with the clock pulse in a phase detector to determine which occurs first. A plus one count results if the bit of information signal occurs first, and a minus one count if the clock signal occurs first, with these counts being accumulated in a reversible counter to control the frequency of the oscillator. Thus, the system operates as an on-off or relay servo mechanism in which the phase of the clock signal is corrected by changing the frequency a set amount in either direction for each received bit. Accordingly, since the count in the bi-directional counter changes only by a single count in response to each bit of information signal, the rate of change of frequency of the clock signal (and thus the time required for synchronization or resynchronization) varies with the bit repetition rate of the information signals and with the change of frequency occasioned by a single count change.

Unfortunately, analysis of this system shows that a digital phase-locked system is only marginally stable unless the clock pulse is phase corrected by each incoming bit. This phase correction is accomplished in this previously disclosed system by applying the incoming data information signal to reset the frequency dividing counter to its initial state. Also, without the phase correction, the system exhibits an effectively infinite noise bandwidth and tends to oscillate strongly at certain frequencies. This necessitates use of the complicated window noise rejection circuit, which was previously mentioned, so that the adverse affects of the incoming noise may be minimized.

Therefore, it is an object of this invention to provide an improved synchronous clock pulse generator system with an inherently stable response characteristic.

Another object of this invention is to provide an improved system capable of synchronizing generated clock pulses with digital information signals wherein the system achieves synchronization quickly without substantial instability.

Yet another object of this invention is to provide an improved synchronous clock pulse generator system capable of responding to binary coded information signals.

A further object of this invention is to provide an improved synchronous clock pulse generator system which operates to generate clock pulses synchronized with incoming digital information and which exhibits improved stability characteristics even in the presence of electrical noise.

These and other objects are achieved in accordance with the invention by including a degree of proportional control in a digital phase-locked loop to ensure the stability of the system without the necessity of a phase resetting feature. As in the previous system of the forementioned co-pending patent application, the digital information signals received are detected and amplified in an input circuit and then delivered to a data converter for changing all received information signals into data pulses of single preferred form. The digital information data pulses in the preferred form are then compared with the time of occurrence of a clock pulse in a phase detector, the output of which is used to control a reversible digital counter wherein the total count is either increased or decreased by one depending upon whether the data pulse or the generated clock pulse occurs first in time. The count contained in the reversible counter is then converted to an analog voltage level through a digital-to-analog converter and applied as a bias voltage to a first input to a summing circuit. The output voltage level from the summing circuit is used for controlling frequency of a voltage controlled oscillator. The other input to the summing circuit is derived directly from the output of the phase detector, hereinafter referred to as the up/down control circuit, which operates to either add to or subtract from the output level established by the bias voltage a small fixed increment of voltage. The oscillator is coupled to provide its output oscillations to a frequency dividing counter which generates a timing pulse to be applied to a clock pulse generator for producing clock pulses to be used by the up/down control circuit and to be applied through the data converter to appear as clock pulse output signals.

More specifically, a proportional control of the digital phase-locked loop is provided by the small voltage increment which is added to or subtracted from the substantially larger bias voltage derived from the count in the reversible counter. Whereas this proportional increment is substantially smaller than the average control voltage for the oscillator, it is substantially larger than the change of voltage resulting from changing the total count in the reversible counter by one. Thus the voltage controlled oscillator supplies oscillations to the frequency dividing counter at a frequency slightly above or below that indicated by the count in the reversible counter, the direction being in accordance with the last decision. Effectively, this proportional control either adds to or subtracts from the nominal number of pulses provided to the frequency dividing counter between decisions, the exact number of pulses added or subtracted by a single decision being dependent upon the interval before the occurrence of the next data pulse during which the increased or decreased frequency is maintained.

Also in accordance with the invention, the greater stability afforded by proportional control of the digital phase-locked loop obviates the need for phase resetting the frequency dividing counter by each incoming data pulse, and also permits elimination of additional and complicated noise rejection circuitry, such as, the noise rejection control circuit or window generator disclosed in the aforementioned patent application. The sensitivity to noise of the synchronous clock pulse generator of the present invention may be controlled simply by the addition of other binary stages at the input to the reversible counter. These additional counter stages need not be connected to the digital-to-analog converter, and simply provide increased inertia in the system. That is, more decisions are required in a particular direction before a significant change is realized in the bias voltage obtained from the digital-to-analog converter.

A better understanding of the invention may be had by reference to the following detailed description taken in conjunction with the accompanying drawings, in which.

It should be understood that the details of the circuits employed in the synchronous clock pulse generator system in accordance with this invention will not be described herein except where necessary to a complete understanding of the invention. The details of these circuits and their components are either generally well known in the art or have been previously disclosed as to their general organization in the previously mentioned copending patent application. Slight modifications in the details of this circuitry will however be pointed out herein and are generally within the ordinary skill of those familiar with the art. It should also be noted that certain elements are illustrated by separate blocks herein for purpose of aiding in the understanding of the invention, but these correspond to identical elements shown or described in detail in the copending application as functional components within other blocks; these instances will also be pointed out hereinafter.

Figures 1, 2:
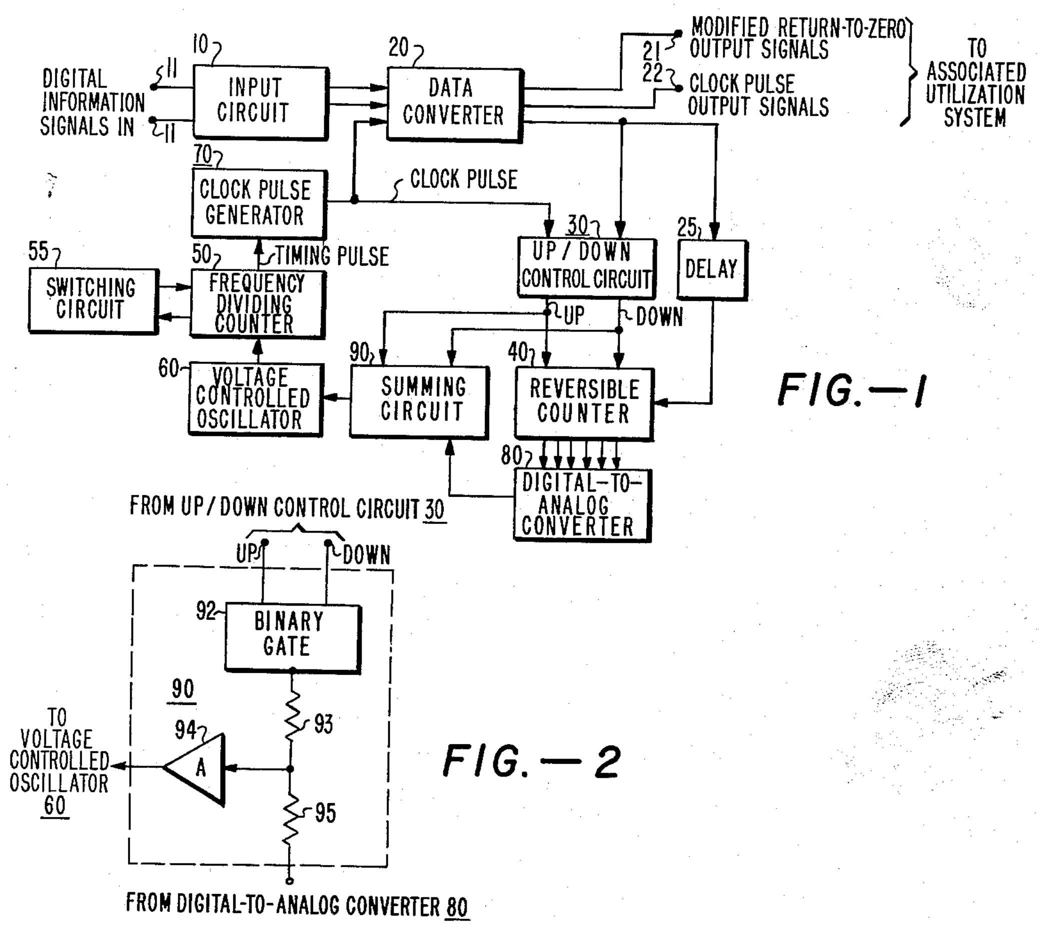
FIG. 1 is a simplified schematic block diagram of an improved synchronous clock pulse generator in accordance with the present invention.
FIG. 2 is a more detailed circuit diagram partially in block diagram form of the summing circuit for use in the system shown in FIG. 1; and, FIG. 3 is a more detailed block diagram illustration of the reversible counter for use in the system shown in FIG. 1.

Referring now to FIG. 1, which shows in block diagram form the general organization of a data regenerator and synchronous clock pulse generator system in accordance with the invention, the digital data information signals are received at a pair of input terminals 11 from one or more information channels and are applied to an input circuit 10 for appropriate amplification, filtering, or reshaping into the digital form in which they were originally transmitted. The input circuit 10 may comprise conventional circuitry suitable for receiving digital information signals, such as, radio receivers, circuits for reproducing digital signals from storage mediums like magnetic tape, signal simulating circuits or the like.

The received digital information signals in their original form are applied as direct current pulses and potential levels to a data converter 20 which operates to change the signals to a preferred digital code form for which the specific data processing or utilization circuit and the remaining elements of the synchronous clock pulse generator system are designed to operate. A preferred form of data converter is described and illustrated in detail in the aforementioned U.S. Patent No. 3,142,802. In an exemplary clock pulse generator system in accordance with this invention, the information signals are converted to signals in what is commonly termed a modified return-to-zero code in which the presence of a short pulse of a first polarity during a specific portion of a bit interval is indicative of a binary digit value of one, while the absence of such a pulse during a bit interval (in other words, the continuation of the established potential level) is indicative of a binary digit value of zero. The converted information signal in modified return-to-zero form are then available for utilization by the associated utilization system (not shown) at an output terminal 21 of the data converter 20. The data converter 20 also derives from the received information signals, a data pulse signal indicative of the presence of a binary one digit to be used in the operation of the remainder of the synchronization system. These data pulse signals are delivered to one of the inputs of an up/down control circuit 30 to be compared in phase with a generated clock pulse and are also applied through a short delay 25 to the input stage of a reversible counter 40.

A frequency dividing counter circuit 50 receives controlled frequency oscillations from the output of a voltage controlled oscillator 60. The oscillations from the voltage controlled oscillator 60 are at a frequency which is a harmonic of the bit repetition rate of the incoming information signals with which synchronization is desired. The frequency dividing counter 50 has a number of binary counter stages, each being a two state bistable circuit, which function to count the number of oscillations from the voltage controlled oscillator 60. An appropriate switching circuit 55 is used to interconnect the binary counter stages of the frequency dividing counter 50 so that timing pulses may be derived from the output of the frequency dividing counter 50 at the appropriate subharmonic of the frequency being received from the voltage controlled oscillator 60. For convenience of illustration, the connections between the frequency dividing counter 50 and the switching circuit 55 are shown as a single pair of leads providing the signals in opposite directions therebetween. By use of the switching circuit 55, a subharmonic may be ideally chosen to provide the timing pulses from the output of the frequency dividing counter 50 at a frequency close to the expected frequency of the incoming information signals, while maintaining the frequency of the voltage controlled oscillator 60 at the approximate center of its controlled range.

The timing pulses derived from the output of the frequency dividing counter 50 are delivered to a clock pulse generator circuit 70 which generates the desired clock pulses. In other words, for a specific setting of the switching circuit 55, a clock pulse is produced from the clock pulse generator 70 each time the given number of oscillations are provided from the voltage controlled oscillator 60 to the input of the frequency dividing counter 50. These clock pulses are then delivered through the data converter 20 to the clock pulse output terminal 22, and are also applied for use in the up/down control circuit 30. The up/down control circuit 30, one form of which is illustrated and described in detail in the aforementioned U.S. Patent No. 3,142,802 as an input control arrangement included within the block diagram of the reversible counter, directs the count to take place in the reversible counter 40 in either a first or a second sense, depending upon whether the clock pulse or the binary one indication signal appears first in time. More specifically, if the clock pulses have a lower repetition rate than the information signals and thus appear after the binary one indication signals, the up/down control circuit 30 responds by delivering a "up" control signal to the reversible counter 40 causing it to increase its count by one; on the contrary, if the clock pulses have a higher repetition rate than the information signals and appear before the binary one indication signals, a "down" control signal is produced causing the count to be decreased by one. After the up or down decision has been made, a binary one indication signal, which has been slightly delayed in the delay circuit 25, is received at the input stage of the reversible counter 40 as the pulse to be counted in the predetermined sense.

As previously described in detail in the aforementioned patent, the reversible counter 40 may be comprised of a number of bistable counter stages interconnected to allow counting in either sense in response to the up and down control signals. Signals indicative of the condition of each of the individual bistable stages of the reversible counter 40 are coupled to a digital-to-analog converter circuit 80, which generates an output bias voltage proportional to the total count for application to one of the inputs of the summing circuit 90. This bias voltage represents the major factor in determining the level of the total voltage appearing at the output of the summing circuit 90, which is used to control the frequency of the voltage controlled oscillator 60. Thus, during an interval in which the binary one indication signals occur before the clock pulses, the increasing count tends to cause the digital-to-analog converter 80 to furnish an increasing bias voltage in order to increase the frequency of the voltage controlled oscillator 60. On the other hand, when the clock pulses appear sooner, then the decreasing count tends to result in a decreasing bias voltage to reduce the frequency from the voltage controlled oscillator 60. As was previously pointed out in the aforementioned patent application, the count stored in the reversible counter 40 is prevented from changing unless binary one indication signals are actually received through the delay 25 at the input stage of the reversible counter 40. Thus, when no binary information signals are received, the bias voltage remains at the previously established level and allows the voltage controlled oscillator 60 to furnish output oscillation at the last established level.

Referring now to FIG. 2, which shows some of the details of the summing circuit 90, the final control voltage delivered to the voltage controlled oscillator 60 may be seen to be derived from an algebraic summation of the bias voltage from the digital-to-analog converter 80 and a small fixed increment derived from the up and down control signals furnished by the up/down control circuit 30. As disclosed in detail in the aforementioned patent, the up and down control signals are derived from the setting of a bistable circuit having outputs similar to those derived from the bistable counter stages within the reversible counter 40. Accordingly, the up and down control signals may be used to control a binary gate 92 similar to the binary gate type of digital-to-analog summing circuits employed in the digital-to-analog converter, as previously disclosed. The output from the binary gate 92 is applied through a resistor 93 to the input of an amplifier 94. The amplifier 94 also receives the bias voltage from the digital-to-analog converter 80 through another resistor 95. Thus the bias voltage plus the increment from the binary gate 92 are combined at the input of the amplifier 94 to deliver a control voltage to the voltage controlled oscillator 60.

The value of the two resistors 93 and 95 in proportion to one another determines the degree of proportional control provided by this arrangement. In an exemplary system according to this invention, the bias voltage from the digital-to-analog converter 80 may have a control range between zero and minus nine volts in one hundred and twenty-eight equal increments. The resistors 93 and 95 are so proportioned that operation of the binary gate 92 either adds to or subtracts one-quarter volt from the voltage level provided by the bias voltage alone; that is, the added or subtracted increment is between three and four times larger than the small incremental change in the bias voltage which can result from a single change of count.

Figure 3:
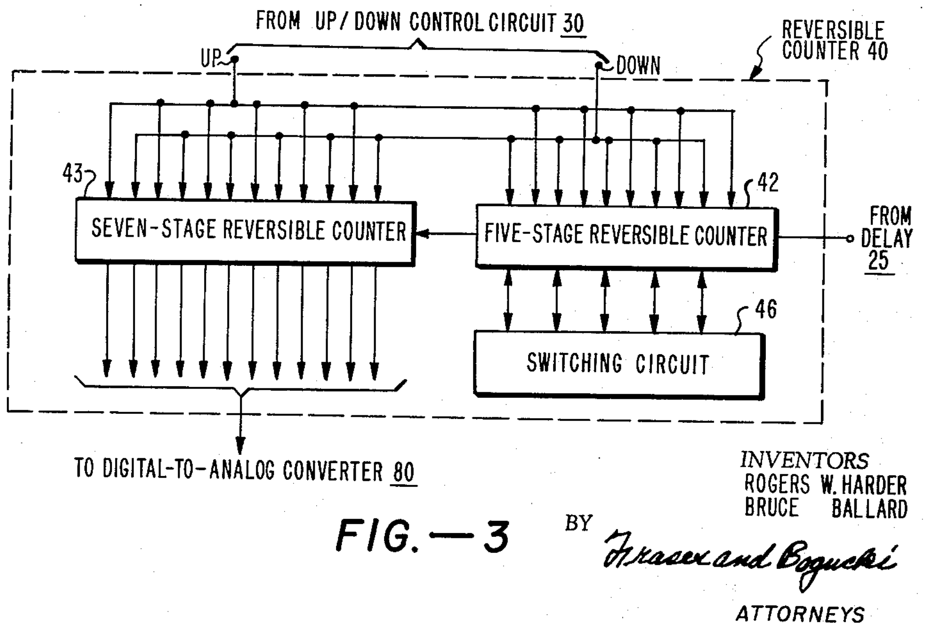

Referring now to FIG. 3, the reversible counter 40 in accordance with this invention may be somewhat modified in contrast with the reversible counter disclosed in the previously mentioned patent. The increased stability of a synchronous clock pulse generator in accordance with this invention permits the addition of increased inertia to the system to prevent undesired excursions in frequency due to electrical noise. As shown in the illustration of FIG. 3, this increased inertia may be provided by additional counter stages, in this case the five stage reversible counter 42, connected at the input of the reversible counter 40. This initial five stage reversible counter 42 operates merely as a frequency divider for the last seven stages 43, since only the last seven stages 43 are connected to the digital-to-analog converter 80. The five stage reversible counter 42, on the other hand, is interconnected through a switching circuit 46 which is used to control the total frequency dividing count available in the five stages, thereby permitting a variable degree of inertia to be added to the system. Thus, only after the chosen number of counts in one given direction have been accumulated in the five stage counter 42 is a pulse finally delivered to the seven stage reversible counter 43 to cause an incremental change in the bias voltage.

In operation, the switching circuit 46 permits the choice of any appropriate count in the five stages 42 between two and thirty-two, which will be in accordance with the expected noise level. Therefore, a single erroneous decision caused by the presence of noise has little if no effect in changing the operation of the system. This is because the erroneous decisions caused by the noise can be expected by the laws of probability to be as much in one direction as in the other for any given extended interval. Thus, instantaneous erroneous counts can be maintained in the initial five stage reversible counter 42 without causing a significant change in the bias voltage from the digital-to-analog converter 80.

The improved operation offered by a synchronous clock pulse generator system in accordance with this invention is best understood by comparison with the system disclosed in the aforementioned patent. The previous system must achieve both phase and frequency synchronization of the clock pulses with the incoming information by changing the count in the reversible counter. Thus, assuming that both the clock pulses and the binary one indication signals are occurring at the same frequency when a phase error is indicated, the phase error either being due to an actual phase difference or resulting from noise, the frequency of the clock pulse is then changed to correct the indicated phase error. However, when the phase error is corrected, the frequency which was previously correct has been changed, which then causes phase errors to start occurring in the other direction. The result is in an inherently unstable servo system response characteristic and requires that the frequency dividing counter be reset by each incoming binary one indication signal. Resetting the frequency dividing counter acts to prevent the previous phase error from being carried over to the next count, which if allowed would result in harmful phase error accumulation within the system.

In contrast, the system in accordance with this invention does not require a reset of the frequency dividing counter 50 and the resetting circuitry disclosed in the previous application may simply be omitted. The proportional control derived from the up/down control circuit 30 through the summing circuit 90 prevents the servo loop instability which formerly made this reset feature necessary. For example, assuming that the binary one indication signal occurs before the clock pulse in time, then an up decision is made. This decision results in a fixed increment being added through the summing circuit 90 to cause a substantial increase in the frequency of the voltage controlled oscillator 60. The increased frequency causes a greater number of pulses to be added to the frequency dividing counter 50 during the following decision interval to make up for the lag in count from the preceding interval. The additional pulses during the decision interval quickly correct the detected phase error without effecting a substantial change in the bias voltage count contained in the reversible counter 40. Therefore, if the additional pulses added during the interval have been sufficient to correct the phase deficiency, then a down decision is made returning the system to its previous frequency. In other words, it is not necessary to cause a somewhat permanent change in the count contained in the reversible counter 40 to correct a detected phase deficiency. The bias voltage can thus be kept fairly stable to maintain frequency synchronization, while the instantaneous phase variation may be corrected with the proportional increment.

Also, an indicated phase error resulting from noise does not have any serious effect upon a system in accordance with this invention due both to the inherent stability provided by the proportional control and the added inertia resulting from the added counter stages. Accordingly, the window type noise rejection circuit or other such devices for minimizing the effects of noise may also simply be omitted while still maintaining improved operation.

It will be understood that various changes in the details, which have been described and illustrated herein and in the aforementioned patent in order to explain the nature of the invention, may be made by those skilled in the art within the principle and scope of the invention as expressed in the appended claims.

What is claimed is:

1. A synchronous clock pulse generator system for receiving data pulses having a variable repetition rate comprising means including a voltage controlled oscillator for generating clock pulses at a controllable rate, phase detector means for comparing the time of occurrence of the clock pulses relative to the data pulses and providing control signals indicative of the comparison, a reversible counter for generating a bias voltage indicative of the count contained therein, said reversible counter being responsive to the control signals to either add or subtract a single count in response to each comparison in order to change the bias voltage by a first increment, and means responsive to said control signals by adding or subtracting a fixed second increment of voltage to said bias voltage in the same sense as said first increment to provide a combined control voltage to said voltage controlled oscillator to change the rate at which the clock pulses are generated in order to phase synchronize the clock pulses with the received data pulses.

2. The synchronous clock pulse generator system of claim 1 wherein said fixed second increment is an order of magnitude larger than said first increment.

3. A synchronous clock pulse generator system for receiving data pulses having a variable repetition rate comprising means for generating clock pulses at a controllable rate in response to the magnitude of an applied control voltage, means for providing a bias voltage indicative of the nominal repetition rate of the data pulses, said bias voltage means including means for changing the bias voltage in small first fixed increments to follow a change in the repetition rate of the data pulses, and means for algebraically combining a larger second fixed increment with said bias voltage and in the same sense as said first fixed increment to produce the control voltage to phase synchronize the clock pulses with the data pulses.

4. A synchronous clock pulse generator system comprising means for receiving digital information signals having a variable bit repetition rate, means coupled to said receiving means for deriving signals indicative of a first digital condition of the information signals, a frequency dividing counter circuit, a voltage controlled oscillator coupled to the input of the frequency dividing counter circuit to provide signals for operating the frequency dividing counter circuit, digital counter means for providing a digital count representative of the repetition rate of the signals indicative of the first digital condition, converter means for providing a bias voltage representative of the digital count coupled to said digital counter means, means coupled to the output of the frequency dividing counter for providing clock pulses, phase comparison means for comparing the time of occurrence of each clock pulse relative to the signals indicative of a first digital condition and providing control pulses indicative of said comparison, said digital counter means being responsive to said control pulses to change the count contained therein by a single count, and means responsive to the control pulses for algebraically combining a fixed increment of voltage with said bias voltage to produce a control voltage for said voltage controlled oscillator.

5. A synchronous clock pulse generator system for receiving data pulses having a variable repetition rate comprising means for comparing the time of occurrence of a data pulse relative to a generated clock pulse, means for accumulating single digital counts in either sense, each count being representative of a single comparison, clock pulse means responsive to a control signal for the phase and frequency of the generated clock pulses, means for generating an incremental signal responsive to the comparison of the time of occurrence of the data pulse and the clock pulse, means responsive to the accumulated count for generating a bias signal, and means for combining said bias signal and said incremental signal to provide a control signal to said clock pulse generating means.

6. In a synchronous clock pulse generator system for receiving digital data signals at a variable frequency rate, the digital phase-locked loop comprising means responsive to the magnitude of a control voltage for varying the frequency and phase of generated clock pulses, digital counter means for accumulating a digital count therein including a first number of binary stages for registering the most significant digits of the count representative of the magnitude of a bias voltage, digital-to-analog converter means coupled to the first number stages in said counter means for providing a bias voltage in accordance with the count contained therein, said digital counter means further including a second number of digital counter stages for counting less significant digits than those contained in said first number of digital counter stages, phase detection means for comparing the time of occurrence of each data pulse with said clock pulses and providing a control signal in accordance with said comparison to control the sense of the count in said digital counter means, and gating means responsive to said control signal for adding a fixed incremental voltage algebraically to said bias voltage to provide a control signal to said clock pulse generating means.

7. A synchronous clock pulse generator including means responsive to the frequency of received signals for generating a first control signal indicative of the nominal frequency of the received signals, means responsive to a phase comparison between the received signal and a clock pulse for generating a second control signal, and a clock pulse frequency generating means for receiving said first and second control signals and producing an output signal indicative of the algebraic sum of said control signals, said second control signal being a fixed increment of said first control signal to provide one of a pair of output frequencies, one slightly above and one slightly below said nominal frequency, to maintain the clock pulses phase synchronized with the received signal.

References Cited by the Examiner

UNITED STATES PATENTS

| | | | |
|---|---|---|---|
| 3,028,552 | 4/1962 | Hahs | 328—63 X |
| 3,029,389 | 4/1962 | Morphet | 328—63 X |
| 3,080,487 | 3/1963 | Mellott et al. | 328—63 X |

ARTHUR GAUSS, *Primary Examiner.*